United States Patent [19]
Kanno

[11] Patent Number: 5,687,694
[45] Date of Patent: Nov. 18, 1997

[54] ENGINE CONTROL

[75] Inventor: Isao Kanno, Hamamatsu, Japan

[73] Assignee: Sanshin Kogyo Kabushiki Kaisha, Hamamatsu, Japan

[21] Appl. No.: 595,229

[22] Filed: Feb. 1, 1996

[30] Foreign Application Priority Data

Feb. 2, 1995 [JP] Japan ................................ 7-015985

[51] Int. Cl.$^6$ ............................ F02D 41/14; F02D 41/22; G01M 15/00
[52] U.S. Cl. ........................ 123/479; 73/119 A; 123/478
[58] Field of Search ........................ 123/479, 490, 123/478; 73/119 A

[56] References Cited

U.S. PATENT DOCUMENTS

| | | | |
|---|---|---|---|
| 4,327,695 | 5/1982 | Schechter | 123/504 |
| 4,589,401 | 5/1986 | Karim et al. | 123/479 |
| 4,903,669 | 2/1990 | Groff et al. | 123/478 |
| 4,932,246 | 6/1990 | Deutsch et al. | 73/119 A |
| 4,989,150 | 1/1991 | Tazawa | 73/119 A X |
| 5,172,588 | 12/1992 | Umemoto | 73/119 A X |
| 5,181,493 | 1/1993 | Motoyama et al. | 123/73 A X |
| 5,469,825 | 11/1995 | Golab et al. | 123/479 |
| 5,535,621 | 7/1996 | Glidewell et al. | 123/478 X |

*Primary Examiner*—Tony M. Argenbright
*Attorney, Agent, or Firm*—Knobbe, Martens, Olson & Bear LLP

[57] ABSTRACT

A control system for an internal combustion engine that includes a fuel injection system. The fuel injection system is monitored in the event of certain abnormalities, either warnings and/or adjustments in the amount of fuel injected are made to compensate for the abnormality. The abnormality may be by sensed by determining the voltage in the actuating coil of the injector or the input signals to the injector. In addition, certain other abnormality controls, such as knocking and temperature controls, are incorporated.

6 Claims, 12 Drawing Sheets

ENGINE CONTROL

BACKGROUND OF THE INVENTION

This invention relates to an engine control and more particularly to an improved fuel injection control for an internal combustion engine.

In the interests of emission control and fuel economy, there have been proposed a wide variety of engine control systems. These systems employ fuel injectors because the fuel injector is capable of measuring and controlling very finite and small amounts of fuel flow. In this way, the fuel flow to the engine can be adjusted almost on a cycle-by-cycle basis, if desired. Various types of controls, including feedback controls, are employed for the strategy of the operation of the system.

Normally, the way in which the fuel flow is controlled is by measuring the actual duration of opening of the injector valve. The timing of opening is also changed in response to varying conditions so as to provide the desired fuel air mixture and, if desired, stratification in the combustion chamber.

However, although it is possible to measure the actual time when the injector valve is opened, various dynamic conditions in the system can cause variations in the amount of fuel delivered in a given time interval of injector valve opening. In addition to the inherent characteristics of the fuel injector, variations in other components in the system such as the pressure regulating and pressure delivery system can cause minute, but nevertheless significant variations in the amount of fuel delivered.

It is, therefore, a principal object of this invention to provide an improved fuel injection control for an internal combustion engine wherein the control permits actual measurement of and comparison of the amount of fuel injected with the targeted amount.

It is a further object of this invention to provide an improved control and method of operating an engine fuel injection system wherein variations in the actual fuel delivery of the injector can be compensated for.

It is a further object of this invention to provide an improved fuel injection system and control method wherein deviations in the operation of the fuel injector and its operational device can be detected.

In addition to the aforenoted factors other reasons may cause the fuel injector not to inject the desired or target amount of fuel. Some of these other defects may be of the type that compensation in fuel injection amount may not be possible. For example the injector may malfunction and not operate at all or may operate in an erratic manner which can not be readily compensated for.

Therefore it is a further object of this invention to provide a system and method where the operator will be warned of malfunctions so that repairs may be made.

SUMMARY OF THE INVENTION

This invention is adapted to be embodied in a fuel injection control system and method that is comprised of a fuel injector. The fuel injector includes an injector valve for receiving pressurized fuel and injecting such fuel to an engine when the injector valve is opened. An electrical operating device is provide for operating the injector valve. A controls circuit is provided for energizing the electrical operating device for a predetermined time period for controlling the amount of fuel injected by the fuel injector.

In accordance with a system embodying the invention, means are provided for measuring the amount of fuel actually delivered by the fuel injector when the injector valve is opened and providing a signal when there is a deviation from the desired amount.

In accordance with a method for practicing the invention, the amount of fuel actually injected by the injector is measured. If there is a deviation, then a deviation signal is generated.

DETAILED DESCRIPTION OF THE PREFERRED EMBODIMENTS OF THE INVENTION

Figure 1:
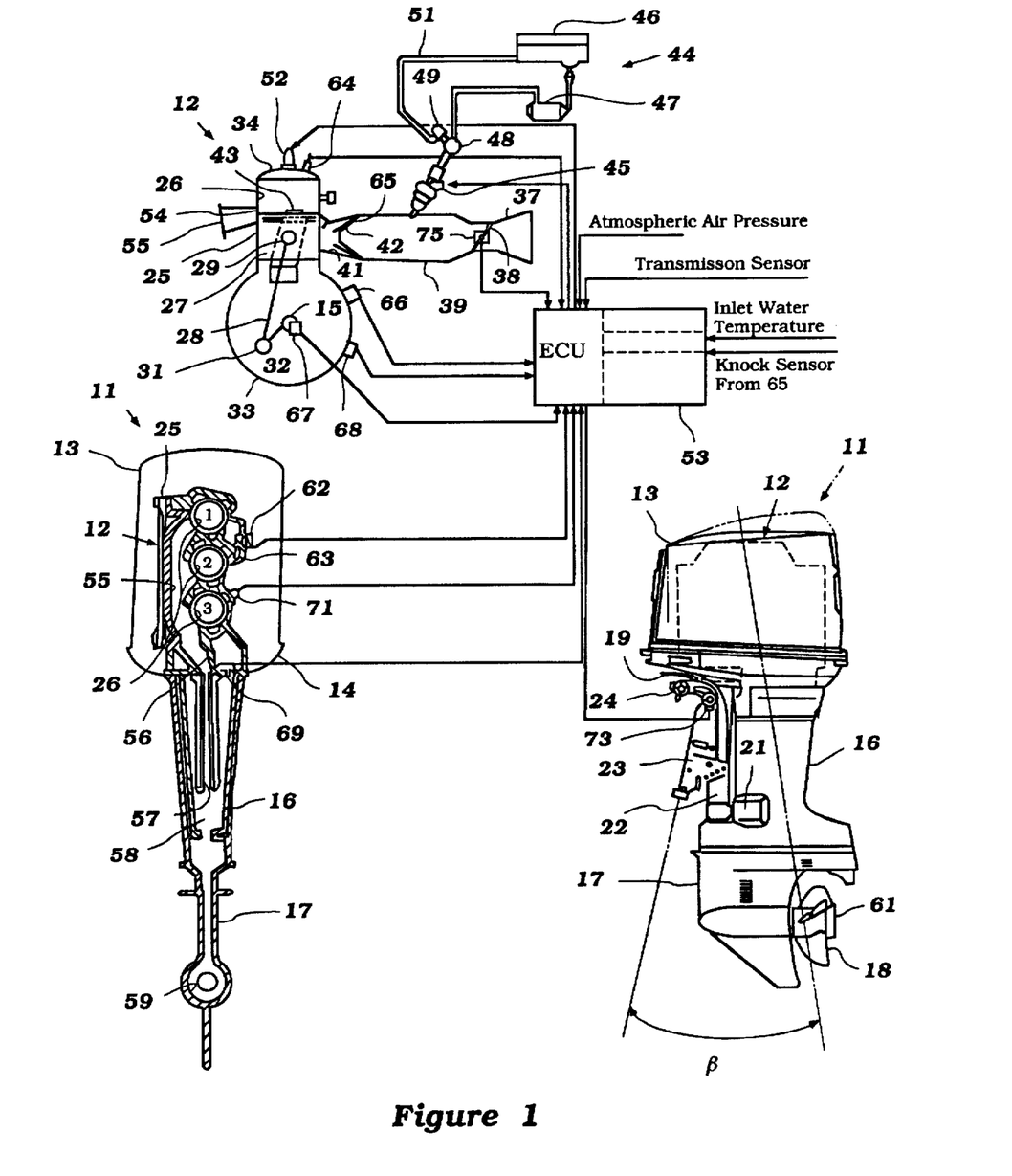
FIG. 1 is a composite view consisting of, at the bottom, right hand side, a partial side elevational view of an outboard motor constructed and operated in accordance with an embodiment of the invention. The lower, left hand view of this figure is a cross sectional view taken generally along the line A—A of the remaining view. This remaining, upper view is a partially schematic cross sectional view taken through a single cylinder of the engine showing the components associated with the control system.

Referring now in detail to the drawings and initially to FIG. 1, an outboard motor constructed in accordance with an embodiment of the invention is identified generally by the reference numeral 11. The invention is described in conjunction with an outboard motor because the invention deals with an internal combustion engine and the control system therefor. Therefore, an outboard motor is a typical application in which an engine constructed and operated in accordance with the invention may be utilized.

The outboard motor 11 is comprised of a power head that consists of a powering internal combustion engine, indicated generally by the reference numeral 12 and a surrounding protective cowling comprised of a main cowling portion 13 that is detachably connected to a tray portion 14.

As is typical with outboard motor practice, the engine 12 is supported within the power head so that its output shaft, a crankshaft indicated by the reference numeral 15 in the upper view of this figure, rotates about a vertically-extending axis. This output shaft or crankshaft 15 is rotatably coupled to a drive shaft (not shown) that depends into and is journaled within a drive shaft housing 16. The tray 14 encircles the upper portion of the drive shaft housing 16.

The drive shaft continues on into a lower unit 17 where it can selectively be coupled to a propeller 18 for driving the propeller 18 in selected forward or reverse direction so as to so propel an associated load, namely a watercraft. A conventional forward reverse bevel gear transmission is provided for this purpose.

A steering shaft (not shown) having a tiller 19 affixed to its upper end is affixed in a suitable manner, by means which include a lower bracket assembly 21, to the drive shaft housing 16. This steering shaft is journaled within a swivel bracket 22 for steering of the outboard motor 11 about a vertically-extending axis defined by the steering shaft.

The swivel bracket 22 is, in turn, connected to a clamping bracket 23 by means of a trim pin 24. This pivotal connection permits tilt and trim motion of the outboard motor 11 relative to the associated transom of the powered water craft. The trim adjustment through the angle $\beta$ permits adjustment of the angle of the attack of the propeller 18 to obtain optimum propulsion efficiency. In addition, beyond the range defined by the angle $\beta$, the outboard motor 11 may be tilted up to and out of the water position for trailering and other purposes, as is well known in this art.

The construction of the outboard motor 11 as thus far described may be considered to be conventional and for that reason, further details of this construction are not illustrated nor are they believed necessary to permit those skilled in the art to practice the invention.

Continuing to refer to FIG. 1 but now referring primarily the lower left hand portion of this figure and the upper portion, the engine 12 is, in the illustrated embodiment, of the three-cylinder in-line type. To this end, the engine 12 is provided with a cylinder block 25 in which three horizontally extending, vertically aligned, parallel cylinder bores 26 are formed. Although the invention is described in conjunction with a three-cylinder in-line engine, it will be readily apparent to those skilled in the art how the invention may be utilized with engines having various cylinder numbers and cylinder configurations. In addition, the invention may also be employed with four stroke engines.

Pistons shown schematically at 27 in FIG. 1 are connected to connecting rods 28 by means of piston pins 29. The lower or big ends of the connecting rods 28 are journaled on respective throws 31 of the output shaft or crankshaft 15, as is well known in this art.

The crankshaft 15 is rotatably journaled within a crankcase chamber 32 formed at the lower ends of the cylinder bores 26. The crankcase chambers 32 are formed by the skirt of the cylinder block 25 and a crankcase member 33 that is affixed to the cylinder block 25 in any well known manner. As has been noted, the engine 12 operates on a two-cycle crankcase compression principal. As is typical with such engines, the crankcase chambers 32 associated with each of the cylinder bores 26 are sealed relative to each other in any suitable manner.

The ends of the cylinder bores 26 opposite the crankcase chambers 32 are closed by means of a cylinder head assembly 34 that is affixed to the cylinder block 25 in any known manner. The cylinder head 34 has recesses which cooperate with the cylinder bores 26 and the heads of the pistons 27 to form combustion chambers, indicated generally by the reference numeral 35. These combustion chambers 35 have a volume which varies cyclically during the reciprocation of the pistons 27 as is well known in this art.

An intake charge is delivered to the crankcase chambers 32 for compression therein by means of a charge forming and induction system, indicated generally by the reference numeral 36. The charge forming and induction system 36 includes an air inlet device 37 that is disposed within the protective cowling of the power head and which draws air therefrom. This air is admitted to the interior of the protective cowling by one or more air inlets formed primarily in the main cowling member 13.

A throttle valve 38 is positioned in the induction passage or intake manifold 39 that connects the air inlet device 37 to respective intake ports 41 formed in the cylinder block 25 and which communicate with the crankcase chambers 32 in a well known manner.

Reed type check valves 42 are provided in each of the intake ports 41 so as to permit a charge to flow into the crankcase chambers 32 when the pistons 27 are moving upwardly in the cylinder bores 26. On the other hand, when the pistons 27 move downwardly these valves 42 close and the charge is compressed in the crankcase chambers 32. The compressed charge is transferred to the combustion chambers 35 through one or more scavenge passages 43.

Fuel is supplied to the air charge admitted as thus far described by a charge forming system, indicated generally by the reference numeral 44. This charge forming system 44 includes one or more fuel injectors 45 that spray into each of the intake passages 39. The fuel injectors 45 are of the electrically operated type having electrically actuated solenoid injector valves (not shown) that control the admission or spraying of fuel into the intake passages 39 upstream of the check valves 42.

Fuel is supplied to the fuel injectors from a remotely positioned fuel tank 46. The fuel tank 46 is, most normally, positioned within the hull of the associated watercraft as is well known in this art. The fuel is drawn through a supply conduit by a pumping system including an electrically driven high pressure pump 47 which discharges into a main fuel rail 48. The fuel rail 48 supplies fuel to each of the fuel injectors 45 in a known manner.

A pressure control valve 49 is provided in or adjacent the fuel rail 48 and controls the maximum pressure in the fuel rail 48 by dumping excess fuel back to the fuel tank 46 or some other place in the system upstream of the fuel rail 48 through a return conduit 51. The fuel that is mixed with the air in the induction and charge forming system 36 as thus far described will be mixed and delivered to the combustion chambers 35 through the same path already described.

Spark plugs 52 are mounted in the cylinder head 34 and have their gaps extending into the respective combustion chambers 35. These spark plugs 52 are fired by ignition coils that are actuated by an ignition circuit that is controlled by a control means which includes an electronic control unit or ECU 53 which will be discussed in detail later.

When the spark plugs 52 fire, the charge in the combustion chambers 35 will ignite, burn and expand. This expanding charge drives the pistons 27 downwardly to drive the crankshaft 15 in a well known manner. The exhaust gases are then discharged through one or more exhaust ports 54 which open through the sides of the cylinder block bores 26 and communicate with an exhaust manifold 55 as shown schematically in the upper view of FIG. 1 and in more detail in the lower left side view of this figure.

Referring now primarily to the lower left hand side view of FIG. 1, the exhaust manifold 55 terminates in a downwardly facing exhaust discharge passage 56 that is formed in an exhaust guide plate upon which the engine 12 is mounted. This exhaust guide plate delivers gases to an exhaust pipe 57 that depends into the drive shaft housing 16.

The drive shaft housing 16 defines an expansion chamber 58 in which the exhaust pipe 57 terminates. From the expansion chamber 58, the exhaust gases are discharged to the atmosphere in any suitable manner such as by means of a underwater exhaust gas discharge 59 which discharges through the hub 61 of the propeller 18 in a manner well known in this art. At lower speeds when the propeller 18 is more deeply submerged, the exhaust gases may exit through and above the water atmospheric exhaust gas discharge (not shown) as also is well known in this art.

In addition to controlling the timing of the firing of the spark plugs 52, the ECU 53 also controls the timing and duration of fuel injection of the fuel injector 45 and may control other engine functions. For this purpose, there are provided a number of engine and ambient condition sensors. In addition, there is provided a feedback control system through which the ECU 53 controls the fuel air ratio in response to the measurement of the actual fuel air ratio by a combustion condition sensor such as an oxygen ($O_2$) sensor 62 which is positioned in a passageway 63 that interconnects two of the cylinder bores 26 at a point adjacent the point where the exhaust passages 54 are located.

In addition to the $O_2$ sensor, other sensors of engine and ambient conditions are provided. These include an in-cylinder pressure sensor 64 and knock sensor 65 that are mounted in the cylinder head 34 and cylinder block 25, respectively. The outputs from these sensors are transmitted to the ECU 53.

Air flow to the engine may be measured in any of a variety of fashions and this may be done by sensing the pressure in the crankcase chamber 32 by means of a pressure sensor 66. As is known, actual intake air flow can be accurately measured by the measuring the pressure in the crankcase chamber 32 at a specific crank angle. A crank angle position sensor 67 is, therefore, associated with the crankshaft 15 so as to output a signal to the ECU 53 that can be utilized to calculate intake air flow and, accordingly, the necessary fuel amount so as to maintain the desired fuel air ratio. The crank angle sensor 67 may be also used as a means for measuring engine speed, as is well known in this art.

Intake air temperature is measured by a crankcase temperature sensor 68 which is also positioned in the crankcase 33 and senses the temperature in the crankcase chambers 32.

Exhaust gas back pressure is measured by a back pressure sensor 69 that is mounted in a position to sense the pressure in the expansion chamber 58 within the drive shaft housing 16.

Engine temperature is sensed by an engine temperature sensor 71 that is mounted in the cylinder block 25 and which extends into its cooling jacket. In this regard, it should be noted that the engine 12 is, as is typical with outboard motor practice, cooled by drawing water from the body of the water in which the outboard motor 11 operates. This water is circulated through the engine 12 and specifically its cooling jackets and then is returned to the body of water in any suitable return fashion.

The temperature of the intake water drawn into the engine cooling jacket is also sensed by a temperature sensor which is not illustrated but which is indicated by an arrow and legend in FIG. 1. In addition other ambient conditions such as atmospheric air pressure are transmitted to the ECU 53 by appropriate sensors and as indicated by the arrows in FIG. 1.

A trim angle sensor 73 is provided adjacent the trim pin 24 so as to provide a signal indicative of the angle $\beta$.

A throttle angle position sensor 75 is also provided and outputs a signal indicative of the position of the throttle valve 38 to the ECU 53.

The basic control strategy for operation of the engine 12 can be of any desired type. That is, the ECU 53 calculates from various engine parameters and from look-up data contained within an internal memory the appropriate timing for the beginning of fuel injection from the injector 45, the duration of injection (i.e., the amount of fuel to be injected each time) and the appropriate timing interval for firing the spark plugs 52.

Since the basic control strategy forms no part of the invention, a further description of it is not believed to be necessary. Also, although the invention is described in conjunction with a feedback control system employing the oxygen sensor 62, the invention can be employed with engine controls not having such feedback control systems as should become readily apparent from the following description.

The invention deals primarily with the monitoring of certain conditions to determine if an abnormal engine operational condition occurs. If the abnormal condition occurs, a warning may be given to the operator and/or the system may make a compensation to adjust for and rectify the abnormal condition.

A first of these abnormal conditions is if the fuel injector 45 or its controls malfunctions and as a result may supply an amount of fuel that is different from that target amount called for by the ECU 53. This can occur if the fuel injector 45 has a malfunction or if there is a low voltage available for operating the injector or in the triggering signal. In one instance, the malfunction can be corrected for and in the others it may not be possible to correct for it.

Figure 2:
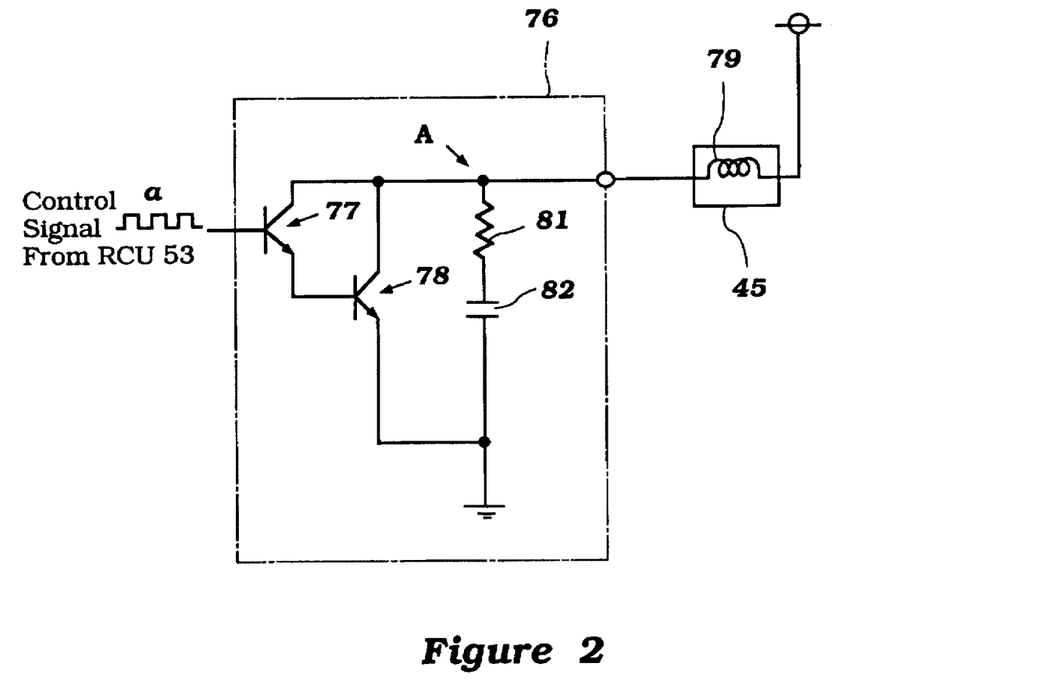
FIG. 2 is a schematic wiring diagram showing the control circuit for actuating the fuel injector actuating solenoid.

FIG. 2 is a schematic view showing how the fuel injector 45 is actually operated. The fuel injector 45 is controlled by a injector control circuit, indicated generally by the reference numeral 76 which receives output signals in the form of square wave pulses generated from the ECU 53. These pulses are indicated by the reference character "a" and are fed to the gate of a first SCR 77. The SCR 77 switches a further SCR 78 that acts to supply power to the winding 79 associated with the injector valve of the injector 45 for actuating it. A filter resistor and capacitor circuit comprised of a resistor 81 and capacitor 82 are provided in the circuitry.

Figure 3:
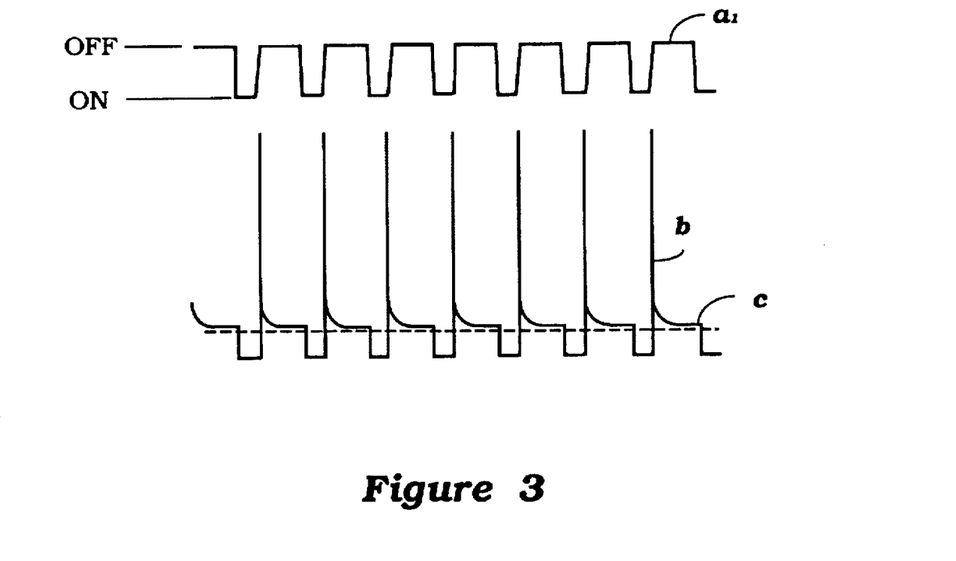
FIG. 3 is a graphical view showing the relationship of the control circuit input signal to the actual voltage in the solenoid winding of the injector valve.

The effect of the switching or control voltage a1 existent in the circuit 51 on the voltage in the coil 79 appears in FIG. 3 and is necessary to understand one way in which abnormal injector conditions may be sent. The switching voltage a1 also has a square wave configuration and, when the switch is on, a voltage c will exist in the coil 79 that effects the actuation of the valve.

Figure 5:
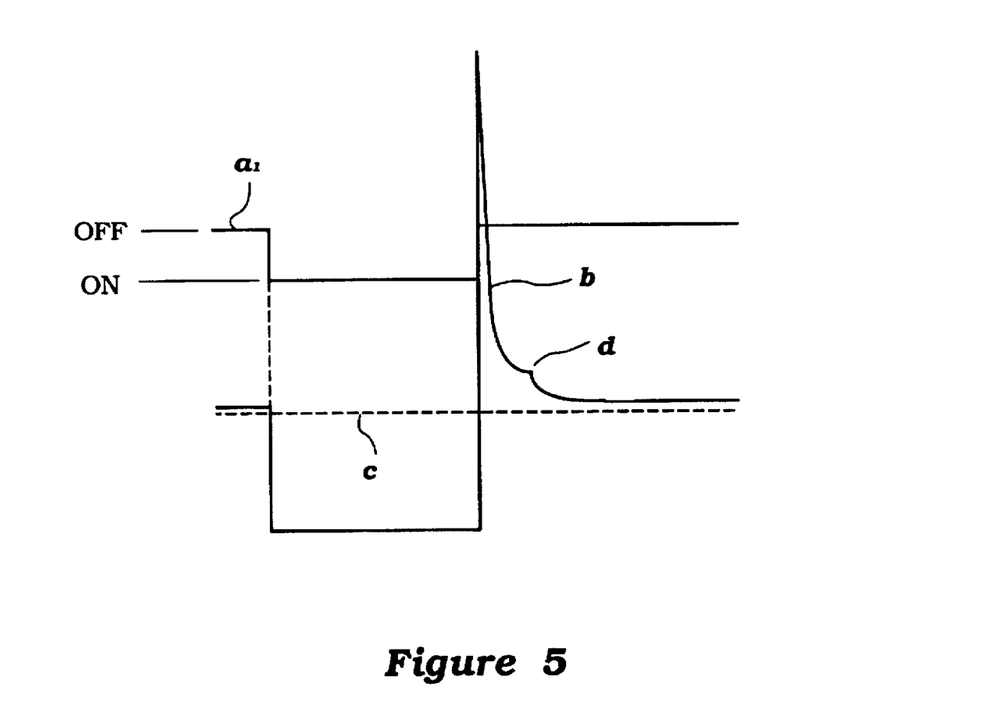
FIG. 5 is a graphical view showing the relationship of the control signal to the voltage in the fuel injector in an normally operating injector.

When the switching voltage a1 is turned off, a voltage spike b will occur due to the fact that the current flow stops and the inductance of the coil will effect such a spike. The actual effect is best seen in FIG. 5. In this figure it will be noted that the spike b is not actually uniform when the injector valve is operating properly and the voltage is above is baseline voltage c. That is, a blip or discontinuity d will occur.

Figure 6:
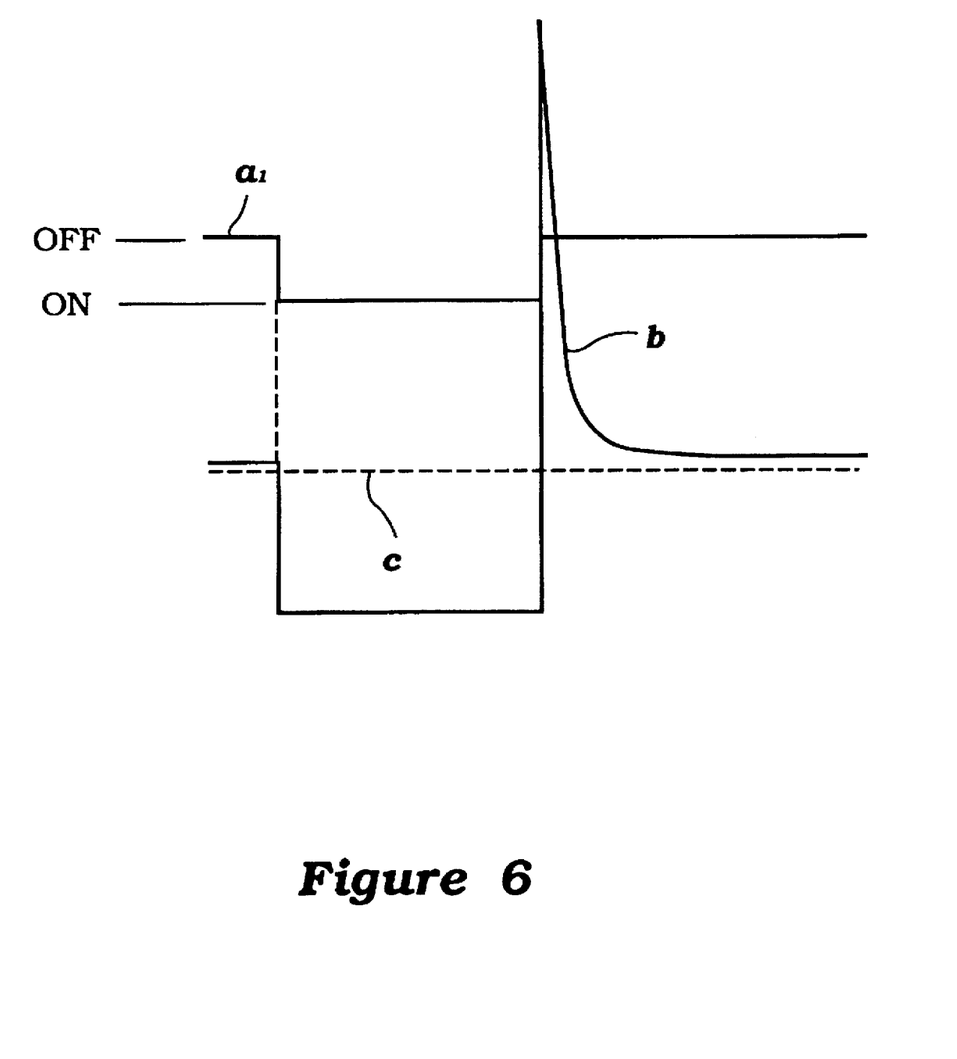
FIG. 6 is a graphical view, in part similar to FIG. 5, and shows the conditions in an abnormally operating injector caused by another type of defect.

This is partially a function of the fact that the armature in the coil is moving and the inductance changes at a normally operating valve. However, if either the valve element or armature is stuck, then the curve will appear as a uniform curve as shown in FIG. 6. The stuck armature or valve will cause a smooth spike b to exist and, hence, by utilizing the appropriate sensor, it is possible to determine if the injector valve is malfunctioning merely by measuring the voltage in the circuit at a point such as the point A as shown in FIG. 2 where the damping affect of the resistor capacitor combination 81 and 82 will not be present.

Figure 4:
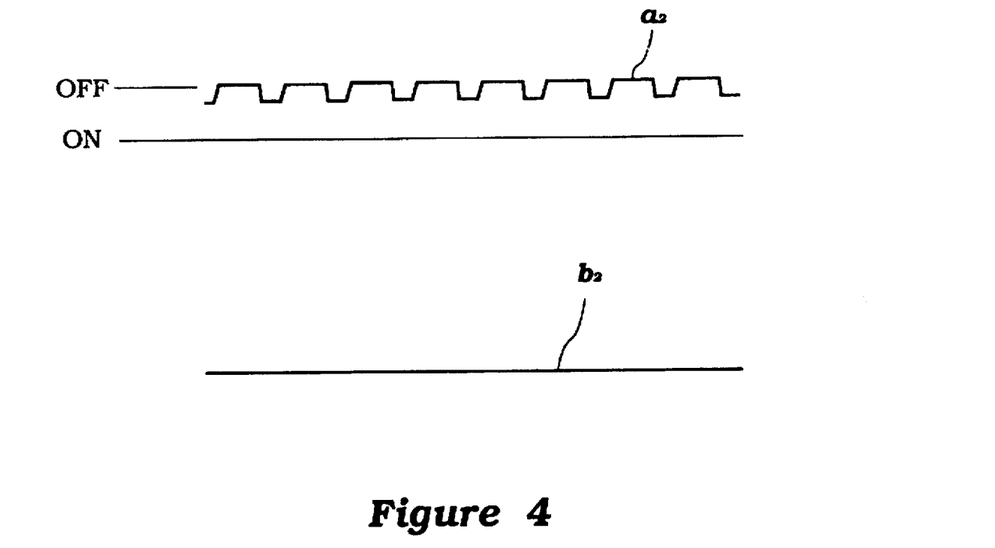
FIG. 4 is a graphical view showing the relationship of the control signal pulses to the current flow through the fuel injector in an abnormally operating injector caused by one type of failure.

FIG. 4 shows another circumstance where there may be a malfunction in the operation of the fuel injector 45. In this case, the control voltage signal, indicated by the reference character a2 is not large enough to effect switching of the SCR 77. Accordingly, the voltage $b_2$ at the point A will not vary and be fixed at a low value. Thus, this is also an indication that there is a malfunction in the fuel injector and the appropriate warning can be given.

Figure 7:
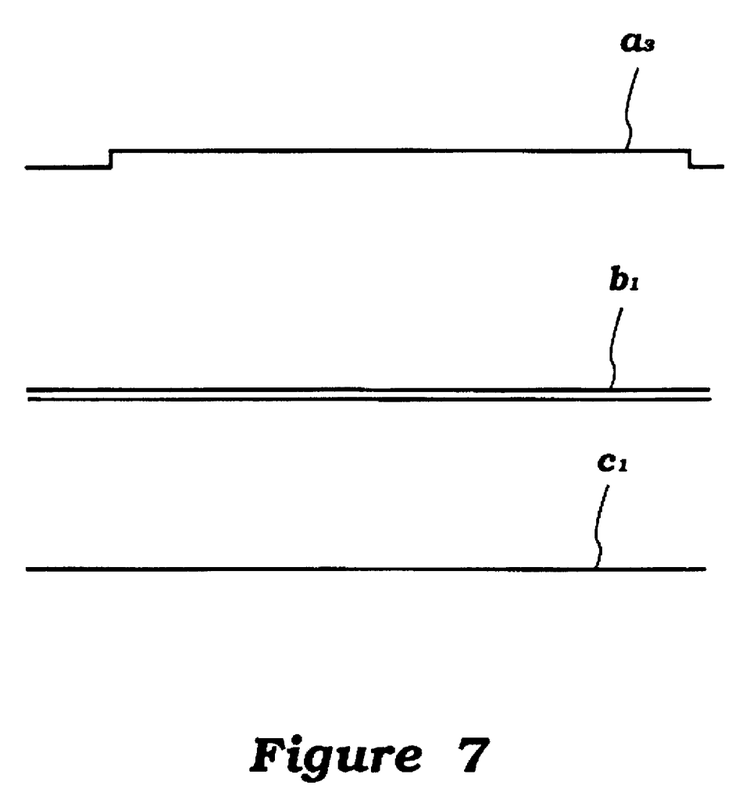
FIG. 7 is a graphical view, in part similar to FIG. 4 showing the relationship of the control signal pulses to the current flow through the fuel injector in an abnormally operating injector caused by another type of failure.

FIG. 7 is another illustration of a type of malfunctioning condition that may occur in the system. Again, there is a voltage signal a3 at the base of the SCR 77 transmitted from the ECU 53 which is not large enough to cause switching and this condition is held is a long time. As a result, the voltage b1 of the winding at the point A may be slightly elevated, but will still be constant and, nevertheless, greater than the reference voltage c1 so as to indicate that there is a malfunction. As a result, the system will again give the malfunction warning.

In addition to providing a warning signal, the system also incorporates a program wherein the amount of fuel actually injected is measured and, if the measured amount varies from the target amount by more than a predetermined amount in more than a predetermined time period, there will be a warning given. This control routine is programmed into the ECU and its description will now be described by reference particularly to FIG. 8.

Before describing this, however, it should be noted that the system is provided with a fuel flow sensor which senses the actual flow of fuel to the individual fuel injector 45 and, accordingly, the amount of fuel actually injected by the injector.

Figure 8:
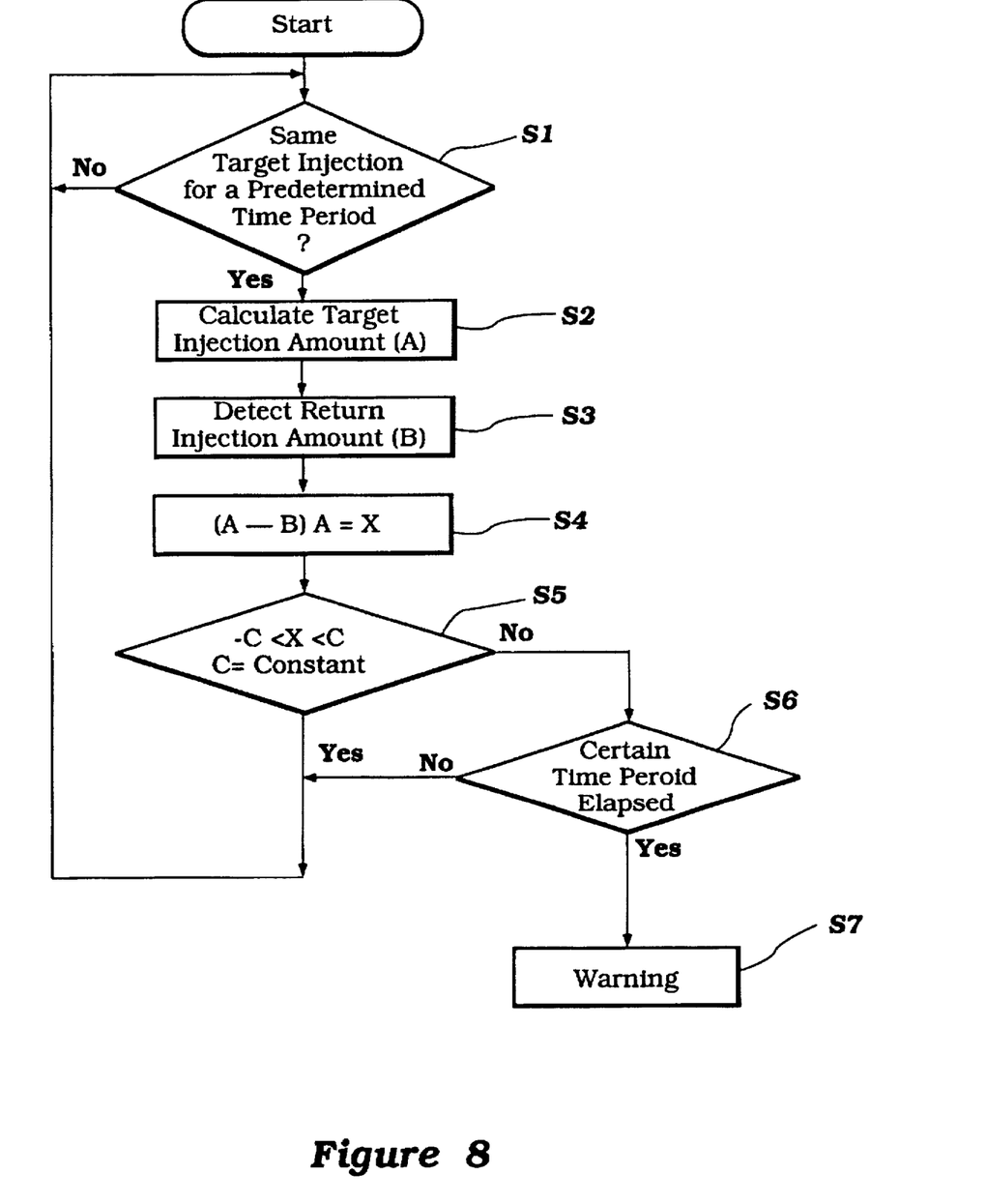
FIG. 8 is a block diagram showing a control routine for detecting objectionable variations in fuel injection amount.
Figure 9:
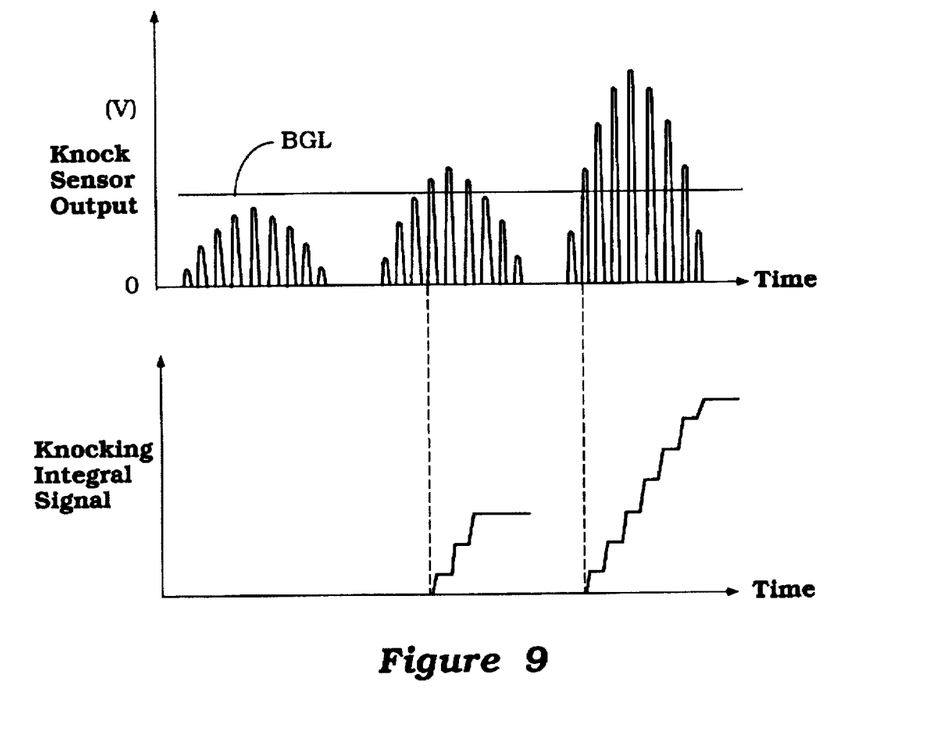
FIG. 9 is a graphical view showing the relationship of knock signals and integrated knock signals in accordance with another embodiment of the invention.

As seen in FIG. 8 when the programs starts, it moves to the step S1 to read the amount of fuel injection targeted and to determine if there has been the same target injection amount for a given time period. The reason for this is that the system is capable of reacting quite quickly and the incremental amount of fuel injected from cycle to cycle may vary under transient conditions. Since the fuel flow sensors are not capable of responding this quickly, the system embodying this concept is unable to respond to instantaneous variations in fuel injection amounts and only can determine if the system is malfunctioning when the same fuel injection amount is required for a predetermined time period. Therefore, at the step S1 the actual amount of fuel targeted is not determined, but merely the change in target in a given time period is checked for. If the target has not remained constant for this predetermined time period, the program repeats.

If, however, at the step S1 the injection amount targeted has been constant for the a time period, the program moves to the step S2 so as to read or calculate the actual amount of fuel injection being targeted. This amount being indicated as "A".

The program then moves to the step S3 so as to read from the flow measurement the actual amount of fuel injected B. This is done by taking the fuel flow measurement for a given time period and dividing that by the number of injections during the fixed time period, thus providing an amount equal to the amount of fuel injected each cycle.

Then, at the step S4 a calculation is made to determine the percentage of variance of the target fuel injection amount relative to the actual fuel injection amount divided by the actual fuel injection amount in accordance with the following formula:

$$(A-B)+A=X$$

It is then determined whether the value of X is greater than or less than a predetermined fixed acceptable variation ratio at the step S5. At this step, the following determination is made:

$$-C<X<C$$

If the difference ratio is in this range, it is acceptable and the program repeats.

If, however, the error is outside of this range, the program then moves to the step S6 to determine if this error conditions has existed for more than a certain time period. If it has not, the program repeats. If, however, the condition has existed for more than the predetermined time period, the program moves to the step S7 so as to issue a warning. In addition, corrective action may be taken actually adjusting the injection target amount toward the direction necessary to bring the value X within the range of −C to +C.

In addition to monitoring the condition of the fuel injectors, the ECU 53 also can monitor other abnormal conditions in engine operation and either provide warnings to the operator of the abnormal conditions or, alternatively, take correction action or both.

FIGS. 9–13 show ways in which the engine may be controlled to preclude or reduce the likelihood of knocking or provide a warning to the operator therefor. As has been noted, the engine is 12 is provided with a knock sensor 65 that outputs its signals to the ECU 53.

Figure 10:
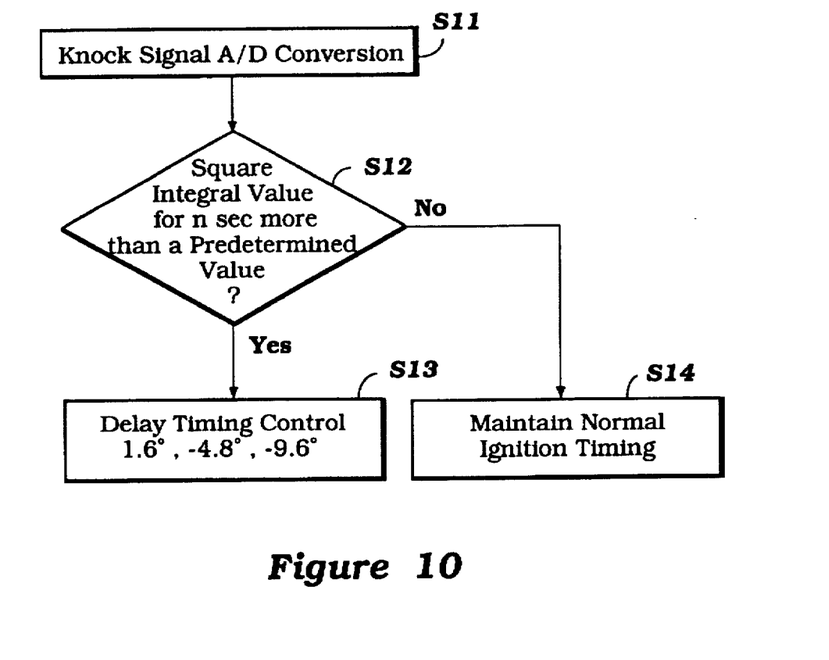
FIG. 10 is a graphical view showing how the control routine whereby the system determines whether the knocking condition requires correction in accordance with an embodiment of the invention.

As seen in FIG. 10 and also later in FIGS. 11 and 12, the output of the knock sensor is a vibration signal. These vibrations are inherent in engine operation and not all vibrations are indicative of an actual knocking condition. Therefore, the system operates wherein the ECU 53 actually integrates the vibration signal with time. However, this integral does not begin unless the vibration signal is over a baseline BGL vibration amount and then the excess value over BGL is integrated.

Vibrations lower than this amount BGL can be considered to be normal engine vibrations and not which indicate knocking or potential knocking signals. Therefore, as seen in the lower graph of FIG. 9, when the vibration signal from the knock sensor 65 exceeds the baseline value BGL, the ECU 53 begins an integrating function summing the number and excess value of times when the signal exceeds the baseline. Only when a certain number of signals have been accumulated will the system react. This is to ensure against hunting in the actual reaction time and to ensure against the provision of warning signals to the operator which may not necessarily require correction.

The logic and method for this operation may be understood by reference to FIG. 10. To briefly summarize, the logic is that, if the square integrated sum of the knocking signals exceeds a predetermined value in a given time period (n seconds), then protective action is taken by retarding the spark timing. Therefore, as may be seen by reference to FIG. 10, when the program starts the knock signals are received and are converted from an analog to a digital value at the step S11.

These digital values are then integrated for a time period and the step S12 it is determined if the square integral value in a given time period of n seconds is more than a predetermined value.

If, at the step S12, it is determined that timing correction is required because of the fact that there have been more than a predetermined number of square integral knock signals in the time period n seconds, the program moves to the step S13 so as to delay the ignition timing on a geometric progression. The initial delay is 1.6° in the illustrated example. If the knocking continues, then the timing will be delayed for 4.8°, 9.6°, etc., until the knocking condition has been remedied.

If, however, at the step S12, the time integral has not been exceeded in n seconds, then the program moves to the step S14 and maintains normal ignition timing. This sequence obviously repeats during engine running.

Figure 11:
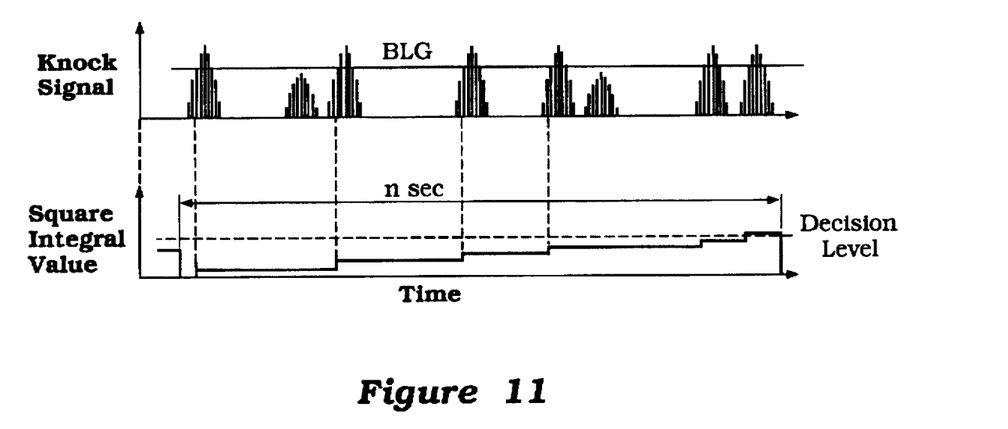
FIG. 11 is a graphical view showing the knock signals and control method in accordance with one type of situation and in accordance with an embodiment of the invention.
Figure 12:
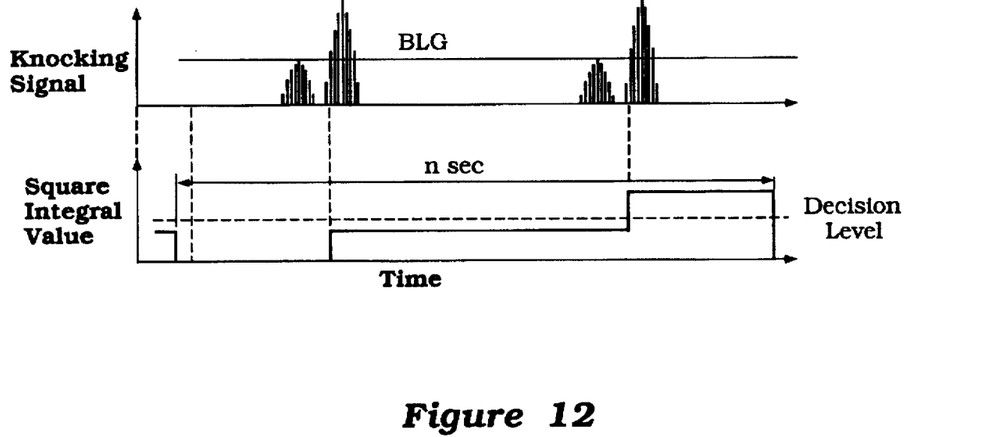
FIG. 12 is a graphical view, in part similar to FIG. 11, and shows another type of condition which is addressed by this embodiment.

FIGS. 11 and 12 show how the system will react to prevent continued knocking, either if there are a large number of relatively small knocking signals, or a lesser number of relatively large knocking signals in the time period n seconds. Each figure shows the threshold knocking level signal BGL, the time period n seconds and the level at which the decision that correction is required which decision level is indicated by the broken line (decision level). Thus, as seen in FIG. 11 where there are a large number of, but relatively small magnitude, knocking signals, the square integral value is accumulated and just before determination of the time period n seconds, the decision level is reached and the corrective factor is made in accordance with the routine shown in FIG. 10. However, with larger value knocking signals, as seen in FIG. 12, the decision value may be reached sooner in the time period and then the protective routine is found.

Figure 13:
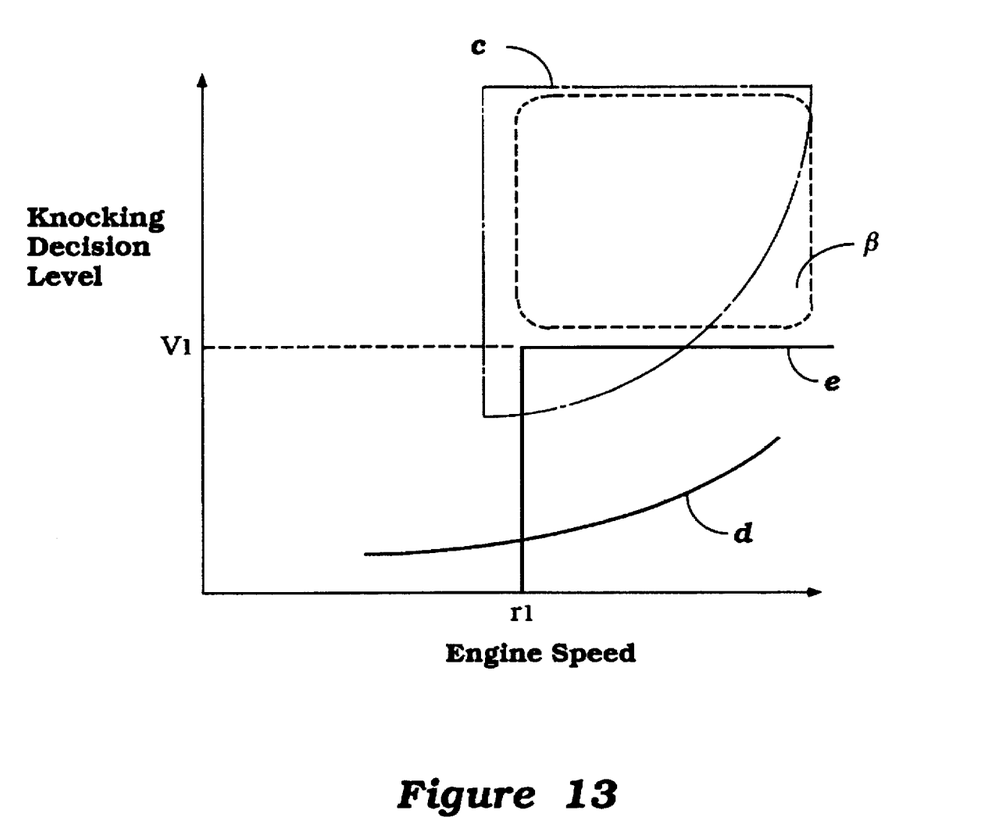
FIG. 13 is a graphical view of engine speed and knock detection decision for the control parameters of maintaining knock control.

In addition to the threshold square integral knocking value at which knocking control has begun, it may also be possible and desirable to design the control strategy so that the spark adjustment is not made even if the knocking level exceeds the predetermined level in the event the engine speed is below a predetermined engine speed such as the speed r1. Thus, as seen in the curve of FIG. 13, if the knocking condition is such as indicated by the curve d, the knocking square value is always less than V1 and even though the speed r1 is exceeded, knocking control is not required. Knocking control is only made in the domain indicated at B.

Thus, if the knocking square integral exceeds V1 in the range indicated at C, knocking control is only made if the curve falls in the range B. This assures against retarded timing under low speed, low load conditions when knocking can be regarded as acceptable and may, in fact, be desirable in engine performance. That is, not all knocking in an engine is undesirable or harmful and this strategy takes that into account.

Thus, in FIG. 13, if the knocking condition is as exists in the area shown at C, there will only be knocking control exerted in the area where this curve overlies the area B. In other words, if the engine speed is below r1, there will be no knocking control exerted. Also, if the engine speed is above r1 and below the line B which coincides with the value V1, then there will be no knocking control.

Figure 14:
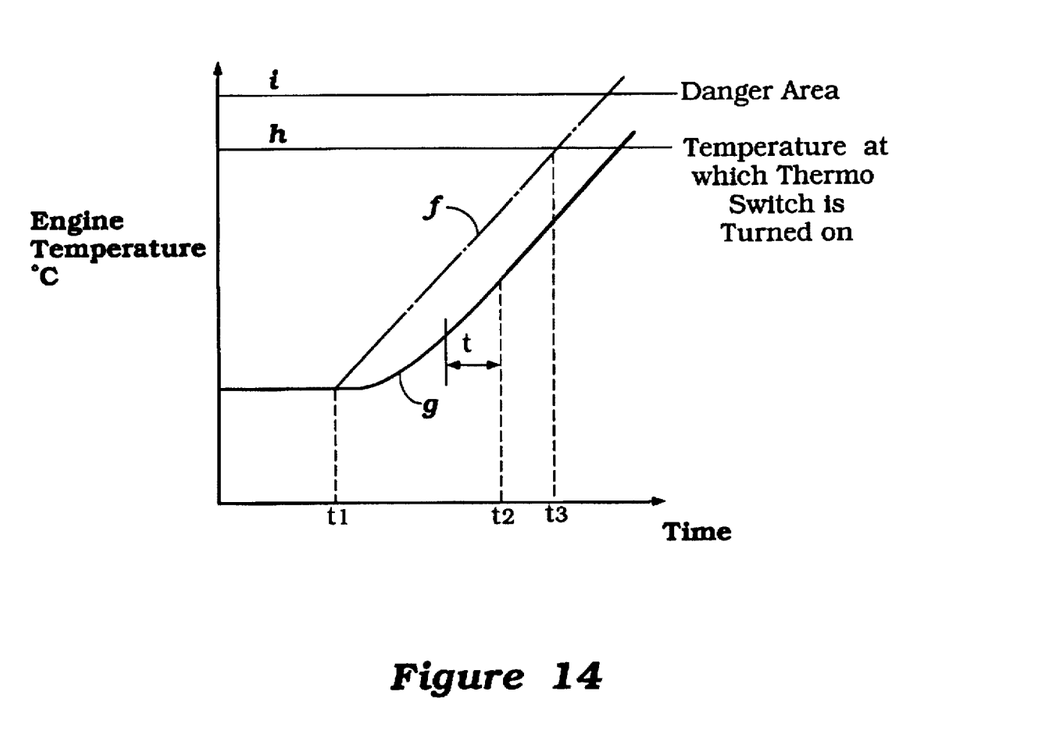
FIG. 14 is a graphical view showing the temperature sensing conditions in accordance another embodiment of the invention for detecting abnormal conditions compared with the prior art.

The control system 53 exerted by the ECU also processes the temperature signal from the sensor 71 so as to provide an over temperature warning, but on a different basis from the prior art type of devices. FIG. 14 is a graphical view showing a solid curve g of engine temperature with relation to time. The temperature level where the temperature is dangerous is indicated by the top line "i" in this figure. Conventional systems employ, in addition to a temperature sensor, an over temperature switch or thermal switch indicated by the line h which is lower than the danger level line i.

Hence, in a normal or conventional system, if the temperature of the engine rises as shown along the dot-dash line f, the temperature switch will activate at the time t3 to provide the indication of over temperature. Actually, this system provides the warning too late to really protect the engine because of the rate of increase in engine temperature. In addition, this type of system requires two switches, the normal temperature switch and the thermal switch.

In accordance with the invention, the system actually processes the rate of change of temperature within the ECU 53 based upon readings of the temperature from the sensor 71. If the slope or rate of change of the temperature in a given time period t is greater than the predetermined amount, as indicated by following the solid curve g, then the temperature warning signal is given at the point in time t2. Hence, corrective action can be taken much earlier and protection afforded than with the prior art types of devices.

Figure 15:
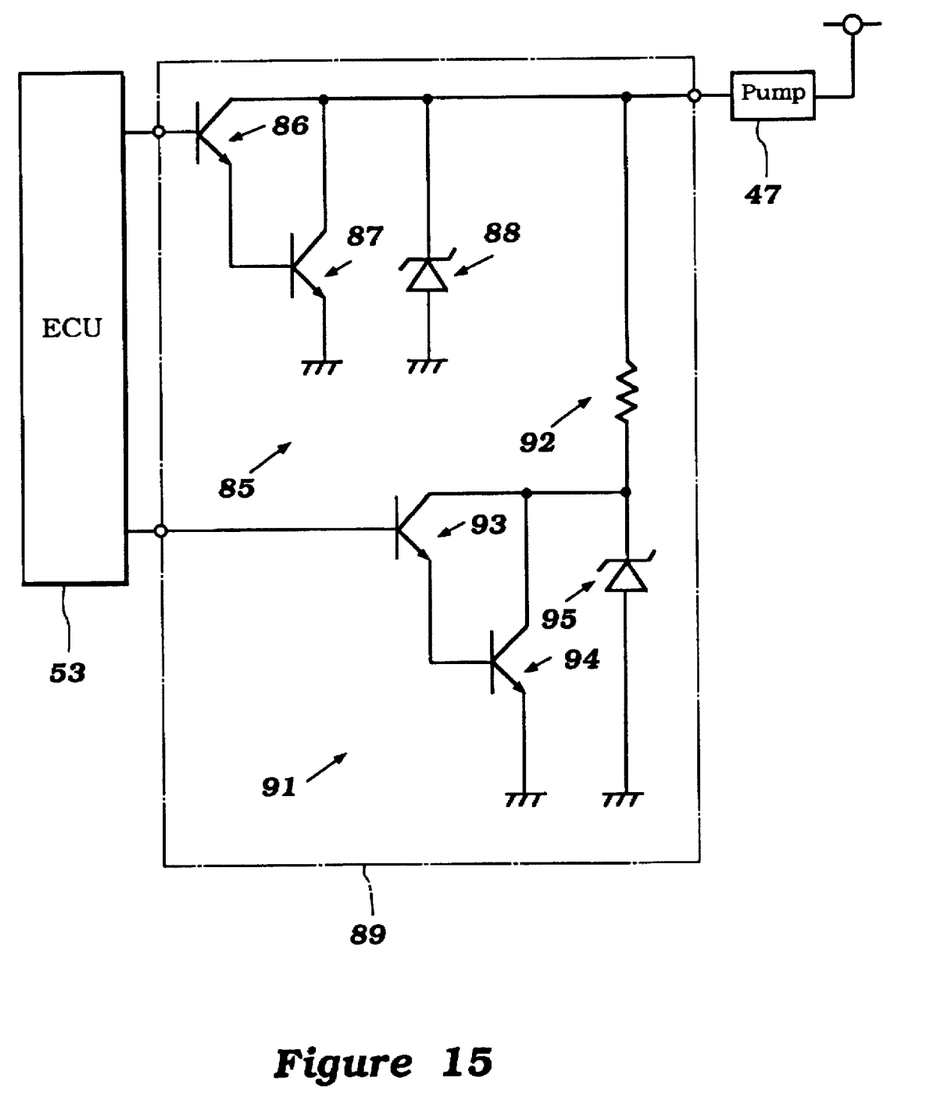
FIG. 15 is a schematic electrical diagram showing another embodiment of the invention.

FIG. 15 illustrates another feature that may be utilized in conjunction with the invention and this has to do with the control for the electric motor for the high pressure pump 47. Normally, this pump is switched on and off by a main control circuit, indicated generally by the reference numeral 85 that is controlled by an output signal from the ECU 53.

This output signal switches the gate of a first SCR 86 which, in turn, controls a second SCR 87 to switch on the flow of electricity to the pump 47. A Zeiner diode 88 is provided for protection in this circuit and is connected to the ground. Normally, with this type of arrangement, a protective resistor is placed in the line from the power source to the pump 47 for surge protection. However, this provides a fixed resistance in the circuit which is not desirable.

Therefore, in accordance with this invention, the pump control circuit, indicated schematically at 89, includes a further circuit 91 that controls the interposition of a resistor 92 in the pump drive circuit. However, this circuit is provided with a further control that interposes the resistor 92 in the pump drive circuit only at the times immediately before the pump 47 is activated and immediately before the pump 47 is shut off. Thus, the resistor 92 operates only under these conditions and, thus, in normal pump operation of the high pressure pump 47 is not present in the drive circuit.

Therefore, the ECU provides an output signal to a further SCR 93 which switches another SCR 94 to bring the resistor 92 into circuit with the ground through a Zeiner diode 95. This is switched on before the main pump is switched on and, thus, is turned off at a predetermined time period after the pump 47 has begun operation.

When the ECU is about to turn off the main control circuit 85, the circuit 91 is again switched on for a brief time period so that the resistor 92 will be interposed in the circuit and offer the protection without the constant imposition in the main circuit.

Figure 16:
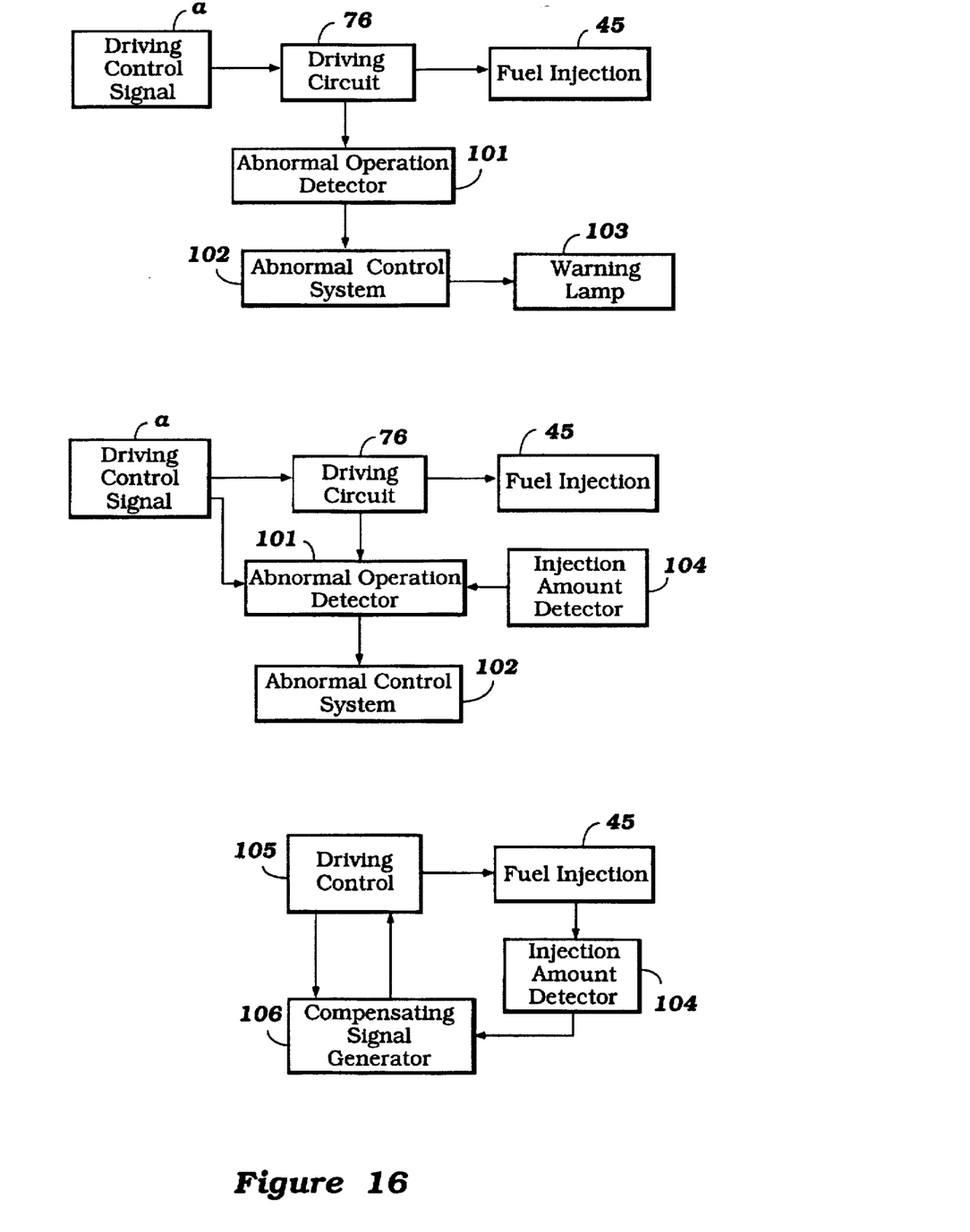
FIG. 16 is a graphic view showing the interrelationship of the various control signals and how the warning light system, fuel injection amount detection system and fuel injection amount compensation are interrelated in accordance with an embodiment of the invention.

Returning again to the description of the abnormal control and particularly that relating to the control for providing for abnormal conditions in the fuel injection circuit, FIG. 16 illustrates the interrelationship between the various components in order to provide the various control and protective actions. The portions of FIG. 16 show at (a) the arrangement whereby the warning detection is given, in (b) the arrangement wherein the amount of fuel actually injected is measured and in (c) the way in which the fuel injection amount is compensated if there is a deviation determined by the components shown in portion (b) of this figure.

As may be seen in FIG. 16(a), the driving control signal a is transmitted to a driving circuit, indicated by 76 and which has already been illustrated and described by reference to FIG. 2. This driving circuit controls the solenoid of the fuel injector 45 as previously noted.

In addition, there is provided an abnormal operation detecting circuit or device indicated at 101 which receives electrical signals from the driving circuit in accordance with the strategies described in conjunction with FIGS. 3–7. The output from the abnormal operation detector 101 is transmitted to an abnormal control system 102 which, among other things, illuminates a warning lamp 103 juxtaposed to the operators position so as to warn the operator of an abnormal condition.

FIG. 16(b) illustrates the relationship which includes the injection amount detector, indicated schematically as 104. As previously noted, this detector may be a flow sensor that senses the actual fuel flow to the fuel injector and, accordingly, the amount of fuel injected by it. This flow signal is converted to a unit signal by dividing the flow by the time period of injection. The injection amount detector 104 outputs its signal back to the abnormal operation detector 101 which then determines in accordance with a routine like that shown in FIG. 8 if there is a deviation that requires correction and outputs a signal to the abnormal control system 102.

The schematic way in which the injection amount is actually altered is shown in FIG. 16(c) wherein it is seen that there is a driving control, indicated at 105 which actually generates the signals a. These signals are based upon the basic output signal form the ECU 53 and a compensating signal generated by a compensating signal generator 106 which operates in accordance with the control routine also described in conjunction with FIG. 8 so as to create a compensated amount of fuel to be injected to accommodate the variations. This may be an increase or a decrease in the amount of fuel supplied by changing the time period a.

Thus, from the foregoing description, it should be readily apparent that the described embodiments of the invention provide not only a good engine control, but also provide an arrangement whereby the control is effective to provide a warning to the operator and also to provide corrective action if certain types of abnormal conditions are detected. Of course, the foregoing description is that of the preferred embodiment of the invention, and various changes and modifications may be made without departing from the spirit and scope of the invention, as defined by the appended claims.

What is claimed is:

1. A fuel injection control system comprised of a fuel injector including an injection valve for receiving pressurized fuel and injecting said fuel to an engine when said injection valve is open, an electrically operated device for operating said injection valve, a control circuit for energizing said electrically operated device for predetermined time periods for controlling the amount of fuel injected by said fuel injector, measuring means for measuring the amount of fuel actually injected by said fuel injector during each injection cycle, determining means for determining when the engine is running in a steady state condition, means for comparing the amount of fuel actually injected by said fuel injector as measured by said measuring means and comparing the amount of fuel actually injected with a target value amount, and means for indicating an abnormality in the operation of said injector valve when the amount of fuel actually injected differs from the target amount by more than a certain difference amount.

2. A fuel injection control system as set forth in claim 1, wherein the control circuit adjusts the duration of fuel injection in the event the amount of fuel injected is detected not to coincide with the target amount.

3. A fuel injection control system comprised of a fuel injector including an injection valve for receiving pressurized fuel and injecting said fuel to an engine when said injection valve is open, an electric solenoid coil winding operatively connected to said injection valve for controlling the position of said injection valve, a control circuit for energizing said electric solenoid coil winding for a predetermined time periods for controlling the amount of fuel injected by said fuel injector, a solenoid coil winding and means for measuring the voltage in said solenoid coil winding after said solenoid coil winding is de-energized, and means for comparing the voltage curve in said solenoid coil winding with a predetermined operative solenoid coil winding curve, and means for indicating a malfunction of said fuel injector when the measured voltage curve in said solenoid soil winding does not match the said predetermined operative solenoid coil winding curve.

4. A method of operating a fuel injection system comprised of a fuel injector including an injection valve for receiving pressurized fuel and injecting said fuel to an engine when said injection valve is open, an electrically operated device for operating said injection valve, a control circuit for energizing said electrically operated device for predetermined time periods for controlling the target amount of fuel injected by said fuel injector, comprising the steps of measuring the amount of fuel injected by said fuel injector during each injection cycle, determining when the engine is running in a steady state condition, comparing the measured amount of fuel injected by said fuel injector with a target value amount, and indicating an abnormality in the operation of said injector valve when the measured fuel injection amount varies from the target amount by more than a predetermined difference amount.

5. A fuel injection control method as set forth in claim 4, wherein the duration of fuel injection is adjusted in the event the amount of fuel injected is detected not to coincide with the target amount.

6. A fuel injection control method comprised of a fuel injector including an injection valve for receiving pressurized fuel and injecting said fuel to an engine when said injection valve is open, an electric solenoid coil winding operatively connected to said injection valve for controlling the position of said injection valve, and a control circuit for energizing said electric solenoid coil winding for predetermined time periods for controlling the amount of fuel injected by said fuel injector, said method comprising the steps of measuring the voltage in the solenoid coil winding after the solenoid coil winding is de-energized, comparing the voltage in said solenoid coil winding with a predetermined operative solenoid coil winding value, and indicating a malfunction of said fuel injector when the measured voltage in said solenoid soil winding does not match the predetermined operative solenoid coil winding value.

* * * * *